(12) United States Patent
Jung et al.

(10) Patent No.: US 11,591,082 B2
(45) Date of Patent: Feb. 28, 2023

(54) APPARATUS FOR GENERATING THRUST FOR AIR TRANSPORT

(71) Applicants: HYUNDAI MOTOR COMPANY, Seoul (KR); KIA CORPORATION, Seoul (KR)

(72) Inventors: Woo Suk Jung, Hwaseong-si (KR); Hee Kwang Lee, Suwon-si (KR); Hyun Seok Hong, Seoul (KR); Hyun Woo Jun, Seoul (KR)

(73) Assignees: HYUNDAI MOTOR COMPANY, Seoul (KR); KIA CORPORATION, Seoul (KR)

( * ) Notice: Subject to any disclaimer, the term of this patent is extended or adjusted under 35 U.S.C. 154(b) by 2 days.

(21) Appl. No.: 17/307,721

(22) Filed: May 4, 2021

(65) Prior Publication Data
US 2022/0126998 A1    Apr. 28, 2022

(30) Foreign Application Priority Data

Oct. 27, 2020    (KR) ........................ 10-2020-0140628

(51) Int. Cl.
*B64C 29/00*    (2006.01)
*B64D 31/10*    (2006.01)
*B64D 27/20*    (2006.01)
*B64D 27/02*    (2006.01)

(52) U.S. Cl.
CPC .......... *B64C 29/0083* (2013.01); *B64D 27/20* (2013.01); *B64D 31/10* (2013.01); *B64C 29/005* (2013.01); *B64C 29/0025* (2013.01); *B64C 29/0058* (2013.01); *B64D 2027/026* (2013.01)

(58) Field of Classification Search
CPC ............ B64C 29/0083; B64C 29/0025; B64C 29/005; B64C 29/0058; B64C 29/00; B64D 2027/026
See application file for complete search history.

(56) References Cited

U.S. PATENT DOCUMENTS

| | | | |
|---|---|---|---|
| 3,041,018 A * | 6/1962 | Brooke-Smith | .... B64C 29/0033 244/12.4 |
| 3,175,787 A * | 3/1965 | Germain | ............. B64C 29/0058 60/39.15 |
| 5,115,996 A | 5/1992 | Moller | |
| 5,131,605 A | 7/1992 | Kress | |
| 10,822,101 B2 * | 11/2020 | Murrow | ..................... B64C 3/10 |
| 2012/0261523 A1 * | 10/2012 | Shaw | ...................... B64C 27/28 244/7 R |
| 2018/0057155 A1 * | 3/2018 | Reichert | ................. B64C 35/00 |

FOREIGN PATENT DOCUMENTS

CN    106828945    *    6/2017

* cited by examiner

*Primary Examiner* — Joshua J Michener
*Assistant Examiner* — Ashesh Dangol
(74) *Attorney, Agent, or Firm* — Lempia Summerfield Katz LLC

(57) ABSTRACT

An apparatus for generating thrust for air transport includes a main thrust device, and an auxiliary thrust device configured to generate auxiliary thrust so as to enable an aircraft to vertically take off and land. The apparatus further includes: wings fixed to left and right sides of a fuselage of the aircraft, rotors installed on the wings and configured to generate thrust. In particular, the main thrust device provides driving force to the rotors using motors and an engine, and the auxiliary thrust device is installed in the fuselage and has a center of gravity configured to coincide with a center of gravity of the aircraft.

8 Claims, 7 Drawing Sheets

APPARATUS FOR GENERATING THRUST FOR AIR TRANSPORT

CROSS-REFERENCE TO RELATED APPLICATION

This application claims priority to and the benefit of Korean Patent Application No. 10-2020-0140628, filed on Oct. 27, 2020, the entire contents of which are incorporated herein by reference.

FIELD

The present disclosure relates to an apparatus for generating thrust for air transport so as to enable an aircraft to safely take off and land.

BACKGROUND

The statements in this section merely provide background information related to the present disclosure and may not constitute prior art.

Before the advent of electric propulsion-type vertical take-off and landing aircraft, tilting fan-type jet engines and engine-based vertical take-off and landing aircraft were mainly used.

The vertical take-off and landing aircrafts utilize at least four ducted fan type engines in consideration of stability in the roll-directional posture thereof and engine failure.

Such vertical take-off and landing aircraft have a complicated configuration because four or more engine systems are mounted therein, and experience problems, such as degradation of the performance and the flying stability thereof, caused by flow separation when maneuvering forwards due to the characteristics of the fans.

Particularly, since such a vertical take-off and landing aircraft can take off and land vertically, it does not require a separate runway, and thus enables service to be provided without high-priced aviation infrastructure. However, we have found that it has a high accident rate during maneuvering the aircraft.

The above information disclosed in the Background section is only for enhancement of understanding of the background of the present disclosure and should not be interpreted as conventional technology that is already known to those skilled in the art.

SUMMARY

The present disclosure provides an apparatus for generating thrust for air transport in which an auxiliary thrust device configured to generate auxiliary thrust is provided in addition to a main thrust device so as to enable an aircraft to safely take off and land.

In one form of the present disclosure, an apparatus for generating thrust for air transport includes: wings fixed to left and right sides of a fuselage of an aircraft, rotors installed on the wings and configured to generate main thrust, a main thrust device including an engine and motors and configured to provide driving force to the rotors, and an auxiliary thrust device installed in the fuselage and configured to generate auxiliary thrust. In particular, a center of gravity of the auxiliary thrust device is configured to coincide with a center of gravity of the aircraft.

The auxiliary thrust device may include micro jet engines arranged symmetrically with respect to the center of gravity of the aircraft.

The center of gravity of the aircraft may be located close to front portions of the wings.

The micro jet engines may be respectively installed in front of and behind the wings.

The micro jet engines may be installed at left and right sides of a region of the fuselage in front of the wings and at left and right sides of a region of the fuselage behind the wings such that the micro jet engines are symmetrically arranged with respect to the center of gravity of the aircraft.

The engine may be installed in front of the center of gravity of the aircraft, and a fuel tank configured to supply fuel to the engine may be installed behind the center of gravity of the aircraft.

The engine may be installed behind the center of gravity of the aircraft, and a fuel tank configured to supply fuel to the engine may be installed in front of the engine.

The engine may be installed as close to the center of gravity as possible.

The apparatus for generating thrust for air transport may further include a controller configured to operate the micro jet engines so as to compensate for a thrust shortage, when an amount of the main thrust generated by the rotors is insufficient during a process for maneuvering the aircraft so as to vertically take off and land. In one form, the thrust shortage is determined by comparing the amount of the main thrust generated by the rotors with an amount of thrust required to vertically take off or vertically land the aircraft.

The controller may perform control so that electric power is uniformly supplied to the respective motors before operation of the micro jet engines.

The controller may perform control so that the electric power is uniformly supplied to the respective motors through inverter control, when a state of charge (SOC) of batteries configured to supply the electric power to the motors is equal to or less than a reference value.

The controller may perform control so that the electric power is uniformly supplied to the respective motor, when any one of the rotors or the motors fails, by blocking supply of the electric power to the motor located at a position bilaterally symmetrical to the failed rotor or motor.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which.

Figure 1:
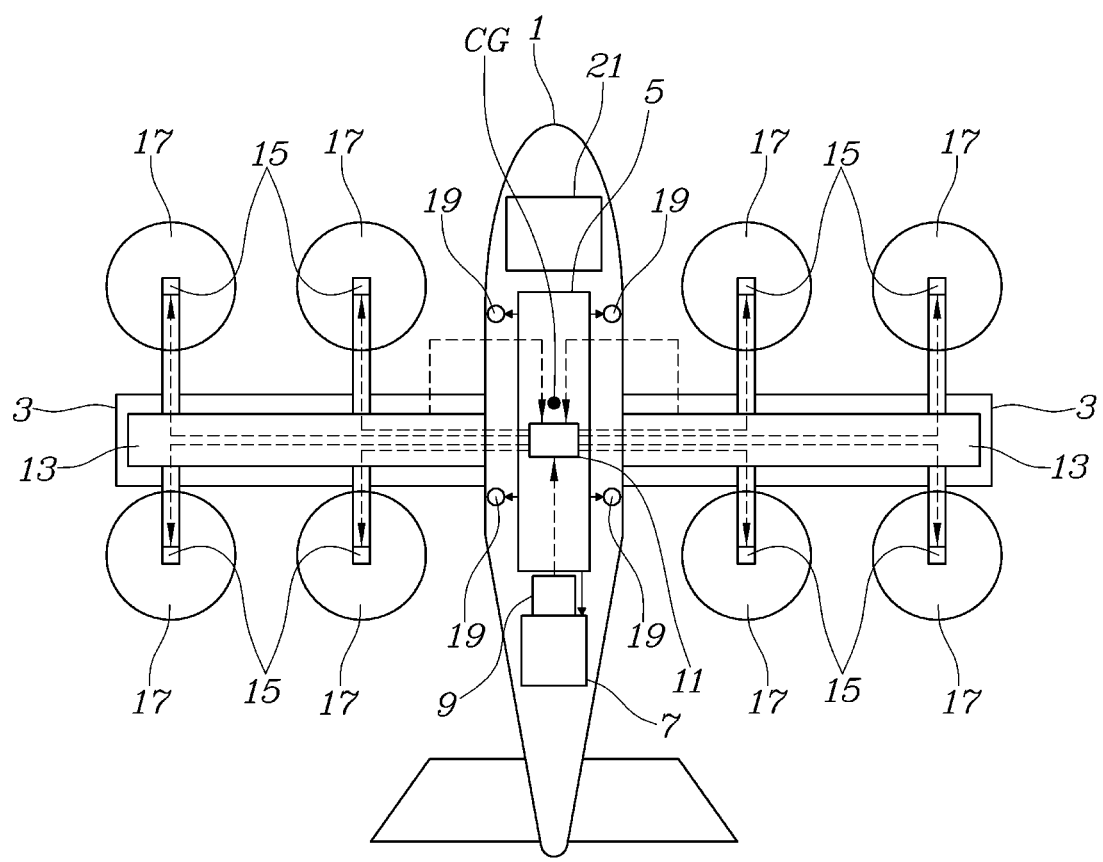
FIG. 1 is a view illustrating the overall configuration of an air transport apparatus according to one form of the present disclosure.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

Reference will now be made in detail to the exemplary forms of the present disclosure, which are illustrated in the accompanying drawings.

FIG. 1 is a view illustrating the overall configuration of an air transport apparatus according to one form of the present disclosure.

Referring to FIG. 1, the apparatus for generating thrust for air transport includes: wings 3 fixed to the left and right sides of a fuselage 1 of an aircraft, rotors 17 installed on the wings 3 and configured to generate thrust, a main thrust device configured to provide driving force to the rotors 17 using an engine 7 and motors 15, and an auxiliary thrust device installed in the fuselage 1 and configured to generate auxiliary thrust. In particular, a center of gravity (CG) of the auxiliary thrust device coincides with a center of gravity (CG) of the aircraft.

In more detail, a fuel tank 5 and the engine 7 are installed in the fuselage 1, and the engine 7 combusts fuel supplied from the fuel tank 5 to generate power.

The power generated by the engine 7 is converted to electric power by a generator 9 installed in the fuselage 1.

Further, batteries 13 are installed in the wings 3, and the electric power converted by the generator 9 is combined with the electric power of the batteries 13 by a power distribution unit 11.

In addition, a plurality of rotors 17 may be installed in the left and right wings 3 so as to be bilaterally symmetrical, the motors 15 may be installed independently in the respective rotors 17, and the respective motors 15 may be connected to the batteries 13 so as to receive electric power supplied from the batteries 13.

Therefore, the electric power of the batteries 13 is distributed to the respective motors 15 so as to drive the rotors 17, and thereby, the main thrust device may propel air transport (hereinafter, referred to as 'an aircraft').

However, when the amount of thrust generated by the main thrust device is insufficient during a process of vertically taking off and landing the aircraft, the aircraft may be propelled through the auxiliary thrust device.

In one form, the main thrust device is installed in the wings 3, whereas the auxiliary thrust device is installed in the fuselage 1 such that a position of the thrust generated by the auxiliary thrust device does not overlap a position of the thrust generated by the main thrust device. In particular, the center of gravity (CG) of the entirety of the aircraft and the center of gravity (CG) of the auxiliary thrust device coincide with each other, and thus, when the auxiliary thrust device generates thrust, the aircraft may vertically take off and land stably without rolling or pitching.

Further, the auxiliary thrust device may employ micro jet engines 19, and the micro jet engines 19 may be installed in front of and behind the center of gravity CG so as to be symmetrical.

These micro jet engines 19 are driven by the fuel supplied from the fuel tank 5.

That is, the auxiliary thrust device should provide a sufficient amount of thrust without affecting the overall apparatus due to the minimal weight and volume thereof, so as to provide the safety of the aircraft.

Therefore, the micro jet engines 19 having a low thrust to weight ratio are applied as the auxiliary thrust device, and may thus provide high thrust compared to the weight of the aircraft, and further, the micro jet engines 19 share the fuel tank 5 with the engine 7 and may thus decrease the weight of the auxiliary thrust device and increase freedom in selection of the mounting position of the auxiliary thrust device due to structural simplification.

Figure 2:
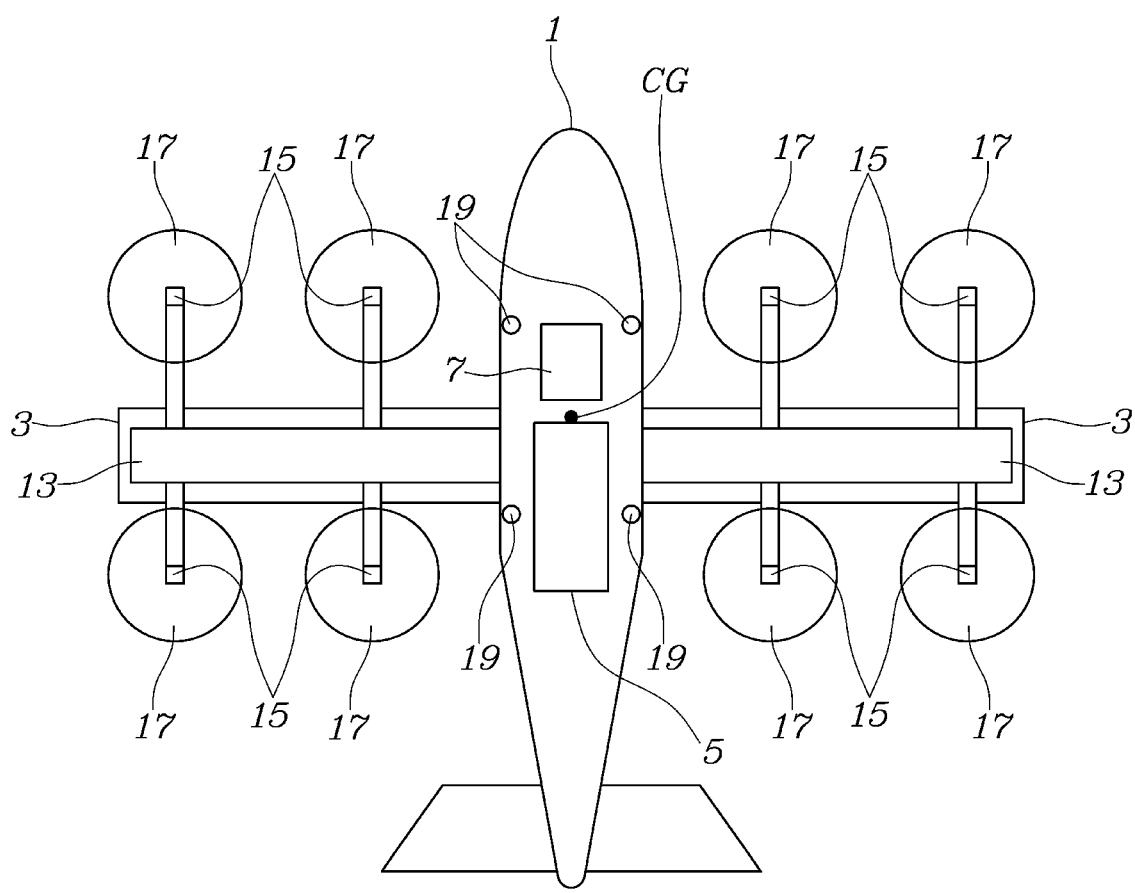
FIG. 2 is a view exemplarily illustrating the arrangement structure of a main thrust device and an auxiliary thrust device according to a first form of the present disclosure.
Figure 3:
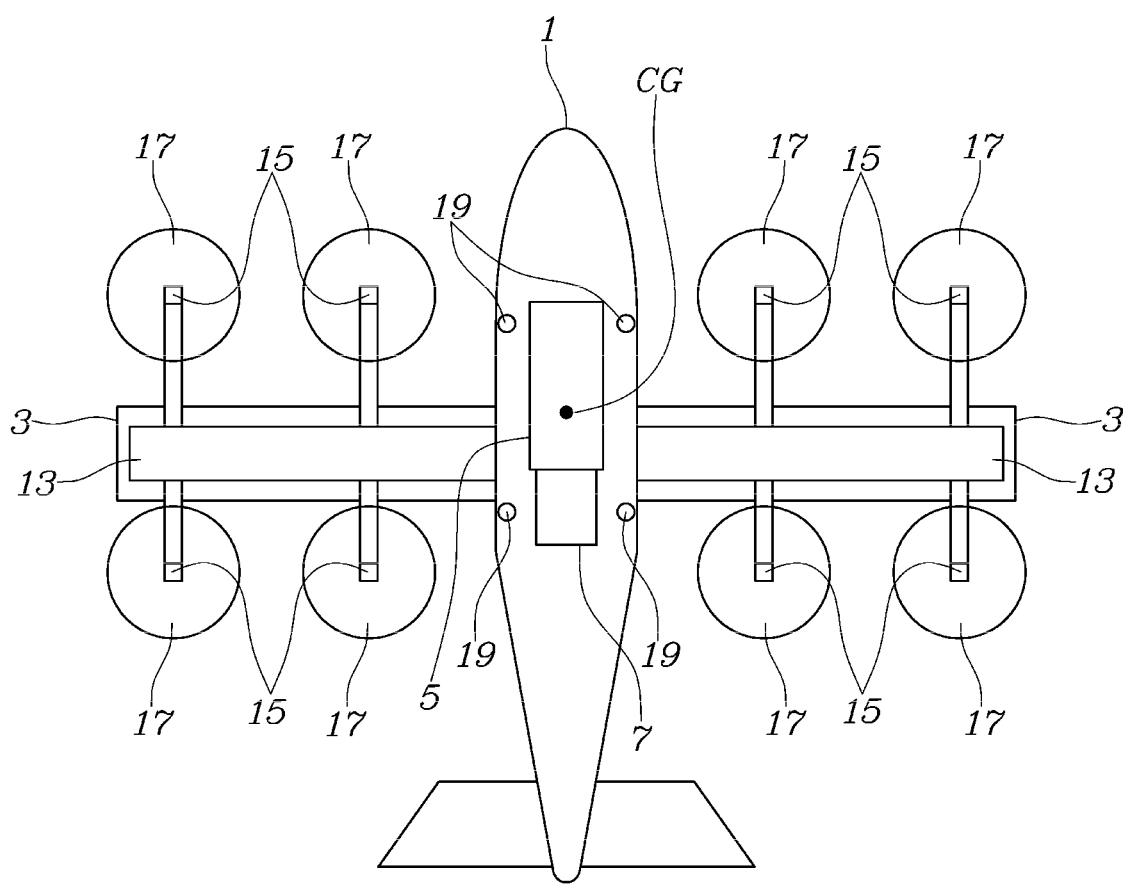
FIG. 3 is a view exemplarily illustrating the arrangement structure of a main thrust device and an auxiliary thrust device according to a second form of the present disclosure.
Figure 4:
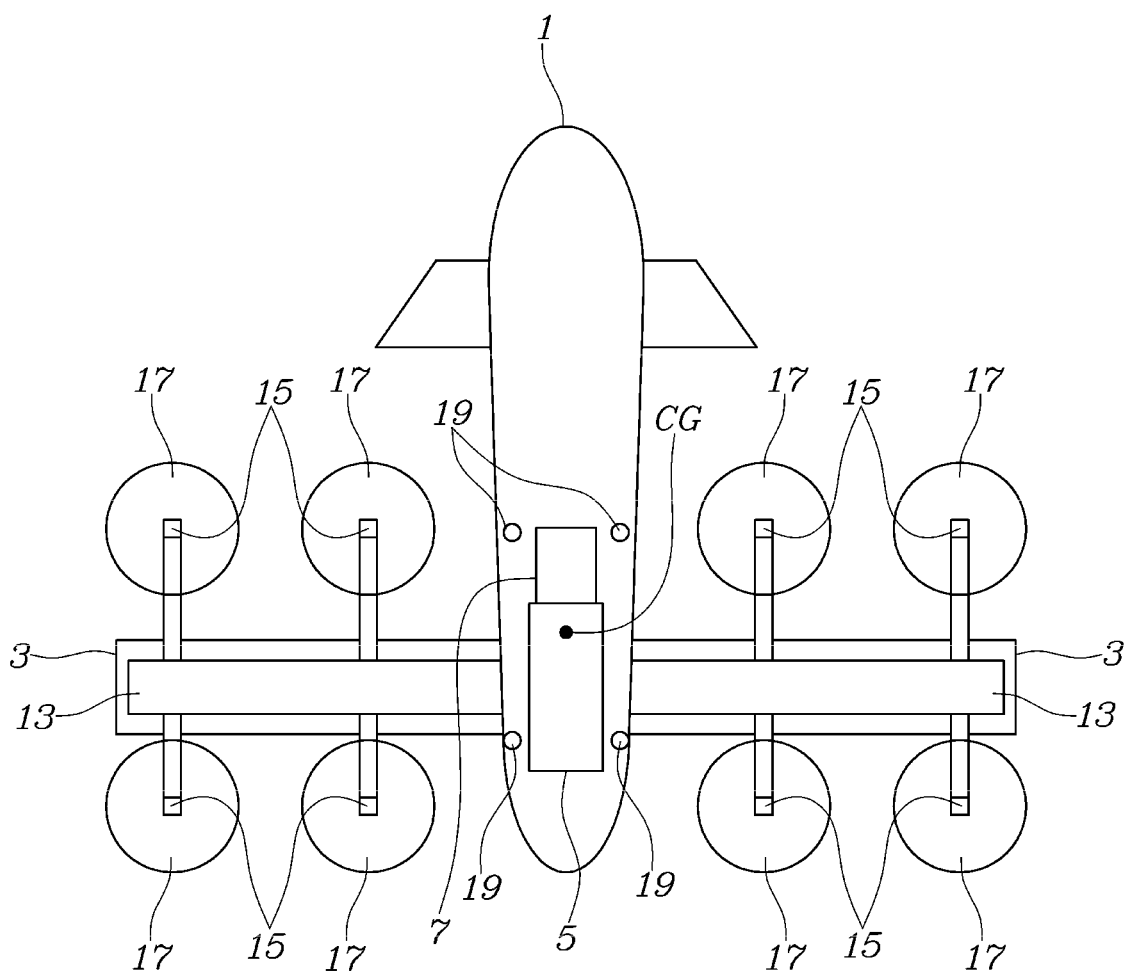
FIG. 4 is a view exemplarily illustrating the arrangement structure of a main thrust device and an auxiliary thrust device according to a third form of the present disclosure.
Figure 5:
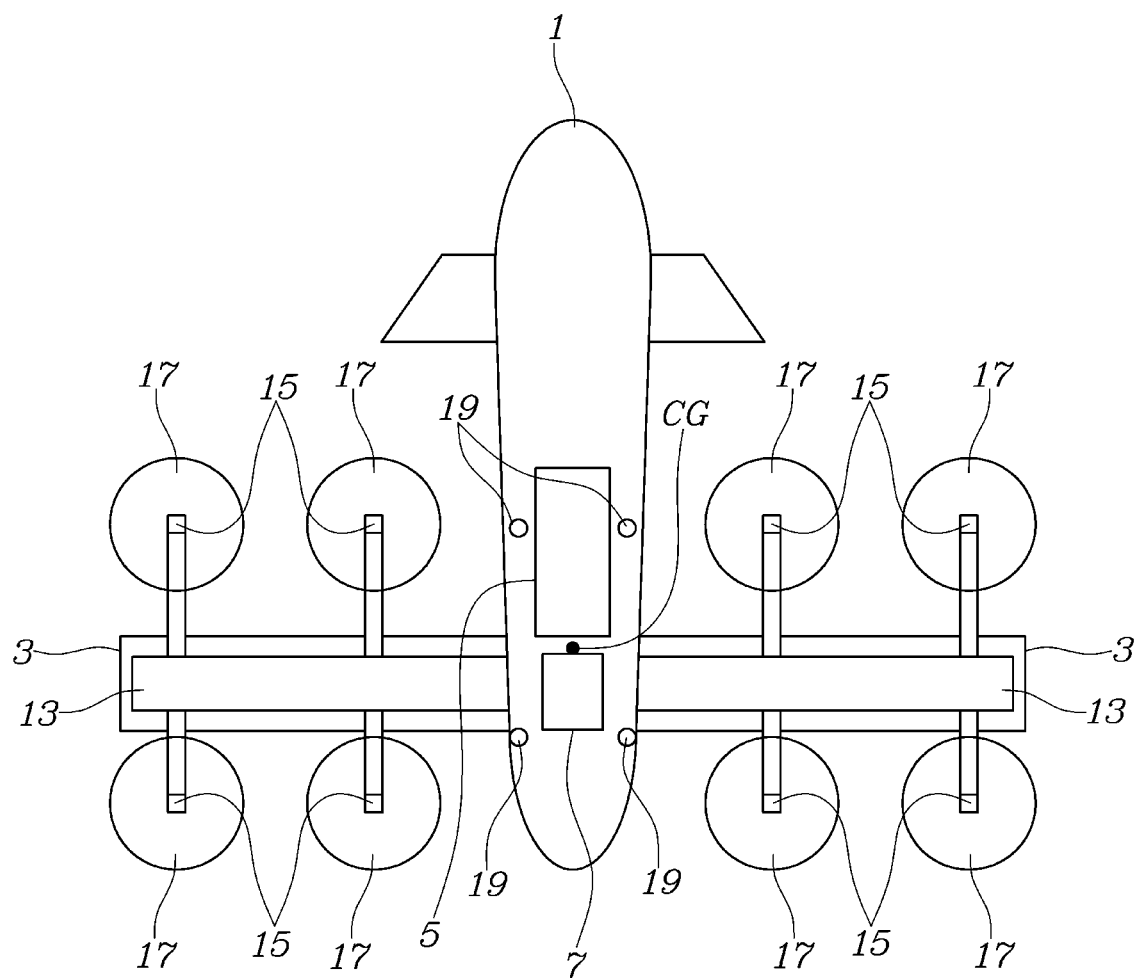
FIG. 5 is a view exemplarily illustrating the arrangement structure of a main thrust device and an auxiliary thrust device according to a fourth form of the present disclosure.

FIG. 2 is a view exemplarily illustrating the arrangement structure of a main thrust device and an auxiliary thrust device according to a first form of the present disclosure, FIG. 3 is a view exemplarily illustrating the arrangement structure of a main thrust device and an auxiliary thrust device according to a second form of the present disclosure, FIG. 4 is a view exemplarily illustrating the arrangement structure of a main thrust device and an auxiliary thrust device according to a third form of the present disclosure, and FIG. 5 is a view exemplarily illustrating the arrangement structure of a main thrust device and an auxiliary thrust device according to a fourth form of the present disclosure.

Referring to these figures illustrating the configurations of the respective forms, the center of gravity CG of the aircraft is located close to the front portions of the wings 3.

For example, in the fuselage 1 in which the wings 3 are fixed to the middle portion of the fuselage 1, as shown in FIGS. 2 and 3, the center of gravity CG of the aircraft is located at the central portion of the fuselage 1, close to the front portions of the wings 3.

Alternatively, in the fuselage 1 in which the wings 3 are fixed to the rear portion of the fuselage 1, as shown in FIGS. 4 and 5, the center of gravity CG of the aircraft is also located at the central portion of the fuselage 1, close to the front portions of the wings 3.

Further, the micro jet engines 19 are respectively installed in front of and behind the wings 3.

In more detail, the micro jet engines 19 are configured to be installed at the left and right sides of a region of the fuselage 1 in front of the wings 3 and at the left and right sides of a region of the fuselage 1 behind the wings 3 so as to be symmetrical.

That is, four micro jet engines 19 are distributed so as to be symmetrical with respect to the center of gravity CG of the aircraft, and more precisely, a pair of micro jet engines 19 is installed at the left and right sides of the region of the fuselage 1 in front of the wings 3 and a pair of micro jet engines 19 is installed at the left and right sides of the region of the fuselage 1 behind the wings 3 so as not to interfere with coupling of the wings 3 to the fuselage 1.

The engine 7 and the fuel tank 5 may be disposed in the fuselage 1 in consideration of the center of gravity CG.

As one example, as shown in FIGS. 2 and 4, the engine 7 may be installed in front of the center of gravity CG, and the fuel tank 5 configured to supply the fuel to the engine 7 may be installed behind the center of gravity CG.

That is, in the arrangement structure in which the engine 7 is located in front of the center of gravity CG, the fuel tank 5 may be installed at a position opposite the engine 7 based on the center of gravity CG.

As another example, as shown in FIGS. 3 and 5, the engine 7 may be installed behind the center of gravity CG, and the fuel tank 5 configured to supply the fuel to the engine 7 may be installed in front of the engine 7.

Here, the engine 7 may be installed as close to the center of gravity CG as possible.

That is, in the arrangement structure in which the engine 7 is located behind the center of gravity CG, the engine 7 is located behind the center of gravity CG in consideration of a reduction in the weight of the fuel in the fuel tank 5 due to consumption of the fuel while flying, and the engine 7 is installed as close to the center of gravity CG as possible.

Figure 6:
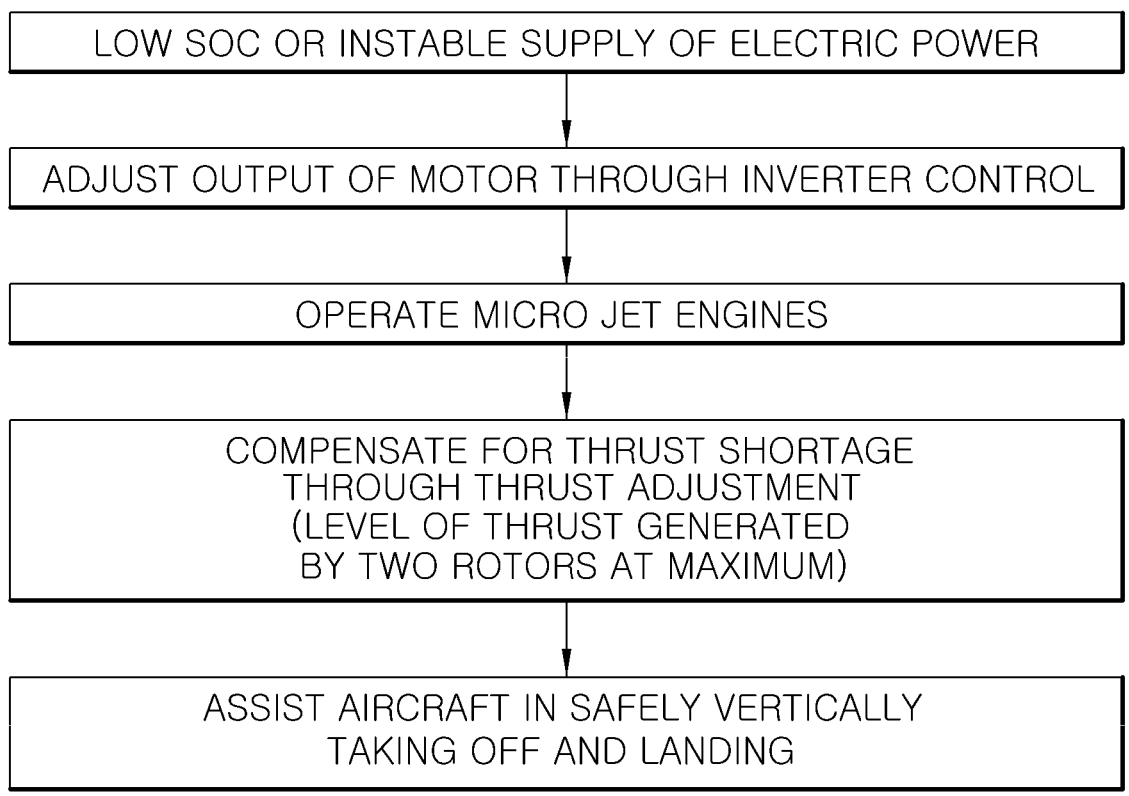
FIG. 6 is a flowchart exemplarily showing one process for using the auxiliary thrust device according to another form of the present disclosure.
Figure 7:
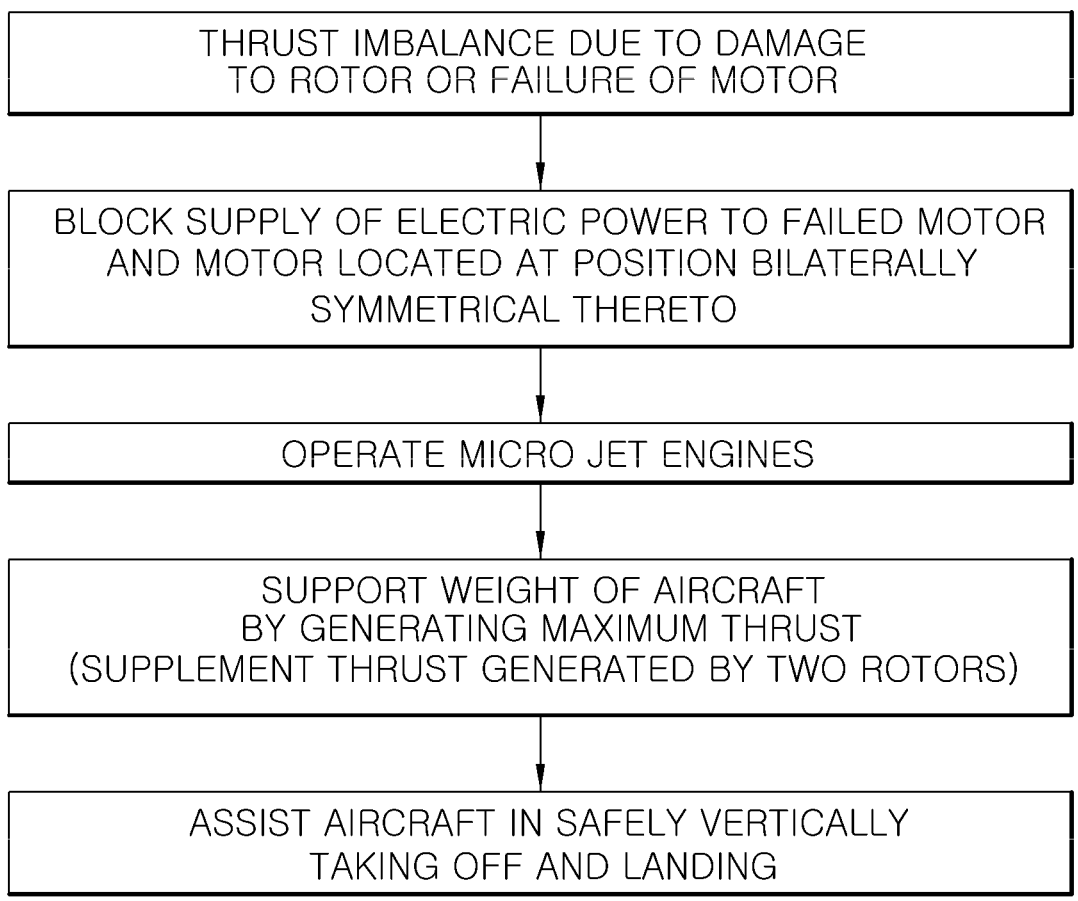
FIG. 7 is a flowchart exemplarily showing another process for using the auxiliary thrust device according to one form of the present disclosure.

FIG. 6 is a flowchart exemplarily showing one process for using the auxiliary thrust device according to one form of the present disclosure, and FIG. 7 is a flowchart exemplarily showing another process for using the auxiliary thrust device according to another form of the present disclosure. In exemplary forms of the present disclosure, the micro jet engines 19 used as the auxiliary thrust device may be controlled to be operated when the amount of thrust generated by the main thrust device is insufficient.

For this purpose, the apparatus for generating thrust for air transport according to one form of the present disclosure further includes a controller 21 configured to operate the micro jet engines 19 so as to compensate for a thrust shortage, when the amount of thrust generated by the main thrust device is insufficient during a process for maneuvering the aircraft so as to vertically take off and land.

Particularly, the controller 21 may be configured to perform control so that electric power is uniformly supplied to the respective motors 15 before operation of the micro jet engines 19.

For reference, the controller 21 according to one exemplary form of the present disclosure may be implemented through a nonvolatile memory (not shown) configured to store data regarding an algorithm configured to control the operation of various elements of a vehicle or software commands to reproduce the algorithm and a processor (not shown) configured to perform operations described herein using data stored in the corresponding memory. Here, the memory and the processor may be implemented as individual chips. Alternatively, the memory and the processor may be implemented as a single integrated chip. Here, one or more processors may be provided.

As one example, the case in which the amount of thrust generated by the main thrust device is insufficient may be the case in which the SOC of the batteries 13 configured to supply electric power to the motors 15 is equal to or less than a reference value.

In this case, the electric power supplied to the respective motors 15 may be controlled to be uniform through inverter control.

Further, in the present disclosure, as another example, the case in which the amount of thrust generated by the main thrust device is insufficient may be the case in which an arbitrary rotor 17 or motor 15 fails.

In this case, electric power supplied to the respective motors 15 may be controlled to be uniform by blocking the supply of electric power to the motor 15 which is located at a position bilaterally symmetrical to the failed rotor 17 or motor 15.

That is, if an emergency situation, such as damage to an arbitrary rotor 17, low SOC of the batteries 13, or malfunction of a distributed electric propulsion system, occurs while the aircraft is maneuvered so as to vertically take off or land, the auxiliary thrust device is operated to supplement the insufficient thrust, and thus, the aircraft may be maneuvered so as to safely take off or land.

Hereinafter, referring to FIG. 6, an operation of supplementing thrust through the micro jet engines 19 in a situation, in which supply of electric power to the motors 15 is instable during vertical take-off and landing of the aircraft, will be described.

If the situation, such as the low SOC of the batteries 13 or instable supply of electric power to the motors 15 occurs during vertical take-off and landing of the aircraft, the electric power supplied to all the motors 15 is adjusted to be uniform through control of the motors 15 using an inverter so as to maintain thrust balance based on the center of gravity CG of the aircraft.

Thereafter, the micro jet engines 19 are operated.

Accordingly, the micro jet engines 19 provide thrust corresponding to the level of thrust generated by about two rotors 17, and thus, support the weight of the aircraft, thereby being capable of compensating for a thrust shortage so as to adjust the thrust of the aircraft.

Therefore, the micro jet engines 19 assist the aircraft in maneuvering so as to safely vertically take off or land.

Further, referring to FIG. 7, an operation of supplementing thrust through the micro jet engines 19 in a situation, in which thrust imbalance occurs due to failure of an arbitrary rotor 17 or motor 15 during vertical take-off and landing of the aircraft, will be described.

If the situation, in which thrust imbalance occurs due to damage to or failure of an arbitrary rotor 17 or motor 15 during vertical take-off and landing of the aircraft, occurs, the operation of the damaged or failed rotor 17 or motor 16 is stopped, and supply of electric power to the motor 15 located at a position bilaterally symmetrical to the failed rotor 17 or motor 15 is blocked.

Thereafter, the micro jet engines 19 are operated.

Accordingly, the micro jet engines 19 provide thrust corresponding to the level of thrust generated by about two rotors 17, and thus, support the weight of the aircraft, thereby being capable of compensating for a thrust shortage so as to adjust the thrust of the aircraft.

Therefore, the micro jet engines 19 assist the aircraft in maneuvering so as to safely vertically take off or land.

As is apparent from the above description, an apparatus for generating thrust for air transport according to the exemplary forms of the present disclosure uses micro jet engines driven by supplying fuel thereto as an auxiliary thrust device so as to be operated separately from an electrical thrust device, and enables dualization of thrust devices, thereby providing robust maneuver of an aircraft so as to safely vertically take off and land in the event of failure of an electric propulsion system.

Further, the micro jet engines share the fuel system of an engine used by a main thrust device and may thus reduce the total weight of additional parts desired to mount the micro jet engines, thereby reducing the weight of the aircraft.

In addition, because the micro jet engines 19 generate a thrust force through a combustion process, they have very high disk-loading compared to rotors, and thus the micro jet engines may generate the thrust force corresponding to 20% of the total weight of the aircraft while using the engine 7 having a small diameter, thereby being capable of minimizing changes in the design of the aircraft.

Although the exemplary forms of the present disclosure have been disclosed for illustrative purposes, those skilled in the art will appreciate that various modifications, additions and substitutions are possible, without departing from the scope and spirit of the present disclosure.

What is claimed is:

1. An apparatus for generating thrust for air transport, comprising:
   wings fixed to left and right sides of a fuselage of an aircraft;
   rotors installed on the wings and configured to generate main thrust;
   a main thrust device including an engine and motors and configured to provide a driving force to the rotors;
   an auxiliary thrust device installed in the fuselage and configured to generate auxiliary thrust, wherein a center of gravity of the auxiliary thrust device is configured to coincide with a center of gravity of the aircraft, and wherein the auxiliary thrust device comprises micro jet engines arranged symmetrically with respect to the center of gravity of the aircraft; and
   a controller configured to operate the micro jet engines so as to compensate for a thrust shortage, wherein the thrust shortage is determined by comparing an amount of the main thrust generated by the rotors with an amount of thrust required to vertically take off or vertically land the aircraft,
   wherein the controller is further configured to uniformly supply electric power to the respective motors before operation of the micro jet engines, and
   wherein when at least one rotor among the rotors or at least one motor among the motors fails, the controller is further configured to uniformly supply the electric power to the respective motor by blocking supply of the electric power to a motor, among the motors, located at a position bilaterally symmetrical to the at least one failed rotor or the at least one failed motor.

2. The apparatus according to claim 1, wherein the center of gravity of the aircraft is located close to front portions of the wings.

3. The apparatus according to claim 1, wherein the micro jet engines are respectively installed in front of and behind the wings.

4. The apparatus according to claim 1, wherein the micro jet engines are installed at left and right sides of a region of the fuselage in front of the wings and at left and right sides of a region of the fuselage behind the wings such that the micro jet engines are symmetrically arranged with respect to the center of gravity of the aircraft.

5. The apparatus according to claim 1, wherein:
   the engine is installed in front of the center of gravity of the aircraft; and
   a fuel tank configured to supply fuel to the engine is installed behind the center of gravity of the aircraft.

6. The apparatus according to claim 1, wherein:
   the engine is installed behind the center of gravity of the aircraft; and
   a fuel tank configured to supply fuel to the engine is installed in front of the engine.

7. The apparatus according to claim 5, wherein the engine is installed close to the center of gravity of the aircraft.

8. The apparatus according to claim 1, wherein the controller is configured to uniformly supply the electric power to the respective motors through an inverter control, when a state of charge ("SoC") of batteries is equal to or less than a predetermined reference value.

* * * * *